(12) United States Patent
Khozan et al.

(10) Patent No.: US 7,044,995 B2
(45) Date of Patent: May 16, 2006

(54) PURIFICATION OF METALS FROM MIXTURES THEREOF

(75) Inventors: Kamran M. Khozan, Toronto (CA); Dmitri S. Terekhov, Newmarket (CA); Victor E. Nanthakumar, Toronto (CA); Sergiy Kovtun, Mississauga (CA)

(73) Assignee: PGM Refining Inc., Toronto (CA)

( * ) Notice: Subject to any disclaimer, the term of this patent is extended or adjusted under 35 U.S.C. 154(b) by 298 days.

(21) Appl. No.: 10/702,606

(22) Filed: Nov. 7, 2003

(65) Prior Publication Data

US 2004/0093986 A1 May 20, 2004

(30) Foreign Application Priority Data

Nov. 13, 2002 (CA) .................... 2411796

(51) Int. Cl.
C22B 11/00 (2006.01)
(52) U.S. Cl. .............. 75/351; 75/371; 75/711
(58) Field of Classification Search ........ 75/351, 75/371
See application file for complete search history.

(56) References Cited

U.S. PATENT DOCUMENTS

| | | | |
|---|---|---|---|
| 3,536,479 A | 10/1970 | Illis et al. | |
| 5,304,233 A | 4/1994 | Awadalla et al. | |
| 5,405,430 A | 4/1995 | Groves et al. | |
| 6,462,095 B1 * | 10/2002 | Bonsel et al. ........... | 516/97 |

FOREIGN PATENT DOCUMENTS

| | | |
|---|---|---|
| GB | 1 082 370 | 9/1967 |
| GB | 1091347 | 11/1967 |
| GB | 1 507 792 | 4/1978 |
| JP | 56003631 | 1/1981 |
| JP | 56003632 | 1/1981 |
| JP | 60092433 | 5/1985 |
| JP | 2002-155306 A * | 5/2002 |
| RO | 90071 | 8/1986 |

* cited by examiner

*Primary Examiner*—George Wyszomierski
(74) *Attorney, Agent, or Firm*—Jeffrey S. Melcher; Manelli Denison & Selter, PLLC

(57) ABSTRACT

A process for preparing a pure PGM (platinum group metal) from a material containing a plurality of PGM compounds, wherein the PGM is selected from the group consisting of Pt, Pd, Os, Ir, Ru, Rh and Re, and the process includes initially forming the PGM in activated form by reduction of PGM ions in aqueous solution at pH 6–8 by a reducing agent, preferably, hydrogen. Subsequently, the activated PGMs are treated by (a) reacting the material with a gaseous reactant to produce a gaseous mixture comprising at least a first volatile PGM complex having a first decomposition temperature and a second volatile PGM complex having a second decomposition temperature, the first decomposition temperature being lower than second decomposition temperature, and a first residue; (b) separating the gaseous mixture from the first residue; (c) heating the gaseous mixture to the first decomposition temperature to produce a pure first PGM and a first volatile PGM complex-free gaseous mixture; (d) collecting the pure first PGM; (e) heating the first volatile PGM complex-free gaseous mixture to said second decomposition temperature to produce a pure second PGM and a second gaseous mixture; (f) and collecting the pure second PGM. The process provides for the extraction and separation of PGMs in an efficacious, economic and environmentally safe manner from ores, slag, mattes and slurries.

13 Claims, 3 Drawing Sheets

PURIFICATION OF METALS FROM MIXTURES THEREOF

FIELD OF THE INVENTION

This invention relates to a process of purification of metals from mixtures and compounds thereof, particularly, the extraction and separation of individual metals of the group defined herein as the platinum group of metals (PGMs) from materials comprising the metals, such as ore, slag, scrap, slurry concentrate, metallurgical intermediates, by-products and the like by the formation, separation and decomposition of volatile compounds comprising the metals. The invention further relates to a method for the production of particulate activated PGMs of use in the aforesaid purification process.

BACKGROUND TO THE INVENTION

By the term "platinum group metal" (PGM) as used in this specification and claims is meant a metal selected from the group consisting of platinum, palladium, rhodium, osmium, ruthenium, iridium and rhenium.

Each of these PGMs is known to form volatile compounds of at least one of the three following groups.

1. A first group of PGM volatile compounds consists of volatile PGM halogen compounds, or complexes of PGM halogens with carbon monoxide. Some of the compounds from this group have a relatively high vapour pressure and relatively low decomposition temperature, which makes them suitable for a subsequent thermal decomposition process to produce the purified metal per se. Others are known to be difficult to synthesis or have extremely high temperatures of decomposition of the order of 600° C.
2. The second group of volatile PGM compounds are complexes of metal diketonates. All such PGM diketonates are solids with a high vapour pressure and most can be decomposed to deposit individual pure PGM metals. The metal diketonates are synthesized in solution, followed by solvent extraction. However, a difficulty with the use of these complexes for metal extraction and separation, is the unfavourable selectivity of the synthesis, as well as the similar sublimation temperatures of the diketonates.
3. The third group of volatile PGM compounds are PGM trifluorophosphine complexes. Most of the PGM trifluorophosphines are liquid and can be easily distilled at normal pressure without decomposition. The decomposition temperatures of PGM trifluorophosphines are, generally, between 140 and 340° C. The distinct exception is the trifluorophosphine complex of palladium which has a low thermal stability. Metals such as Ni, Co, Fe, Cr, Mo, Mn and W also form trifluorophosphine complexes. However, with the exception of Ni, Fe and Co, such complexes are solid and have very low vapor pressures [1].

The main properties of metal trifluorophosphine complexes are presented in Table 1, while, general information about the synthesis of PGM trifluorophosphine complexes is presented in Tables 2, 3 and 4.

TABLE 1

Physical properties of PGM of trifluorophosphines.

| Compound | Melting point | Boiling point | Decomposition temperature |
|---|---|---|---|
| HRh(PF$_3$)$_4$ [5] | −40° C. | 89° C. | 140° C. |
| HIr(PF$_3$)$_4$ [5] | −39° C. | 95° C. | 245° C. |
| HRe(PF$_3$)$_5$ | 42° C. | Subl. 20° C. /10 mm | 160° C. |
| H$_2$Os(PF$_3$)$_4$ [3] | −72° C. | 280° C. | 340° C. |
| H$_2$Ru(PF$_3$)$_4$ [3] | −76° C. | 180° C. | 290° C. |
| Pt(PF$_3$)$_4$ [4] | −15° C. | 86° C. | 130° C. |
| Pd(PF$_3$)$_4$ [4] | −40° C. | | −20° C. |

The general method of synthesis comprises the reduction of PGM salts with copper or zinc, under pressure, with phosphorus trifluoride. Phosphorus trifluoride (PF$_3$) is a colorless gas with a boiling point of −101.8° C., has similar complexing properties to carbon monoxide and can be easily synthesized from phosphorus trichloride and zinc fluoride. There is no evidence about decomposition of PF$_3$ during the thermal decomposition of the complexes; and the reagent gas can be recycled. This makes PF$_3$ ideal for recycling as well as allowing of the deposition of ultra pure metals [6].

The trifluorophosphine complexes of PGM metals can be separated into two main groups, namely, trifluorophosphine metal hydrides and trifluorophosphine metals. The corresponding parameters for the synthesis of these two groups of compounds are represented in Tables 2 and 3. The trifluorophosphine metal hydrides are thermally and chemically stable. In aqueous systems, the complex hydrides HM(PF$_3$)$_n$ are strong acids. Except in the case of HRh(PF$_3$)$_4$, the thermal release of hydrogen occurs only at high temperatures and with complete decomposition of the molecule. The decomposition process can be represented as follow:

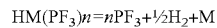
$$HM(PF_3)n = nPF_3 + \tfrac{1}{2}H_2 + M$$

The resulting PF$_3$ and H$_2$ gas mixture can be recycled.

The thermal stability of volatile trifluorophosphine complexes of PGM is much lower than trifluorophosphine metal hydrides (Table 1). Palladium trifluorophosphine is stable only under a PF$_3$ atmosphere. Platinum trifluorophosphine is decomposed at 130° C. The lower thermal stability of Pt and Pd complexes ma be used in their separation from other volatile trifluorophosphine complexes, especially the very volatile Ni(PF$_3$)$_4$. The thermal decomposition process can be represented as follows:

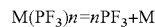
$$M(PF_3)n = nPF_3 + M$$

The resulting PF$_3$ gas mixture may be recycled.

TABLE 2

Parameters for the synthesis of the trifluorophosphine complexes hydrides
MXn + 4 PF$_3$ + L½ H$_2$ + nCu (Zn) = H$_1$M(PF$_3$)$_4$ + n CuX

| Starting material | Pressure (Bar) | | Temperature ° C. | Yield % |
|---|---|---|---|---|
| | PF$_3$ | H$_2$ | | |
| CoI$_2$ [5] | 50 | 30 | 170 | 100 |
| RhCl$_3$ [5] | 90 | 30 | 170 | 100 |
| IrCl$_3$ [5] | 160 | 45 | 240 | 100 |
| OsCl$_3$ [3] | 400 | 100 | 270 | 80 |
| RuCl$_3$ [3] | 300 | 100 | 270 | 70 |

TABLE 2-continued

Parameters for the synthesis of the
trifluorophosphine complexes hydrides
$MXn + 4 PF_3 + L\frac{1}{2} H_2 + nCu (Zn) = H_lM(PF_3)_4 + n CuX$

| Starting material | Pressure (Bar) | | Temperature | |
|---|---|---|---|---|
| | $PF_3$ | $H_2$ | °C. | Yield % |
| $ReCl_5$ | 250 | 100 | 300 | 40 |
| $FeI_2$ | 300 | 100 | 270 | traces |

TABLE 3

Parameters for the synthesis of the trifluorophosphine complexes
$MXn + 4 PF_3 + nCu (Zn) = M(PF_3)_4 + n CuX$

| Starting material | Pressure $PF_3$ (Bar) | Temperature °C. | Yield % |
|---|---|---|---|
| $PtCl_4$ | 40 | 100 | 94 |
| $PdCl_2$ | 300 | 100 | 80 |
| $NiI_2$ | 135 | 100 | 100 |
| $FeI_2$ | 400 | 180 | 70 |

TABLE 4

Parameters for the synthesis of the
trifluorophosphine complexes directly
from metals.

| Starting material | Pressure $PF_3$ (Bar) | Temperature °C. | Yield % |
|---|---|---|---|
| Pt [4] | 40 | 100 | 100 |
| Pd [4] | 250 | 100 | 95 |

Although, volatile individual PGM compounds and complexes as hereinbefore described are known to be formed and decomposed thermally to produce the pure metal, it is not known whether such processes are applicable when a plurality of PGMs are present together in varying degrees as various compounds, in such materials as, for example, ore, slag, scrap, slurry, concentrate, metallic intermediates, by-products and the like. This uncertainty is enhanced when other non-PGMs, such as, for example, Ni, Co, Fe, Cr, Mo. Mn and W are present and known to form complexes, such as, for example, with trifluorophosphine, and especially when some of these complexes, notably, Ni, Fe and Co are volatile with practical vapour pressures and thermally decomposable.

It is known, however, that PGMs do not always react with an aforesaid gaseous reactant to a sufficient extent in a satisfactory manner.

It is known that metals in the form of activated particulate metal are more reactive with reactant gases such as, for example, carbon monoxide and phosphorous trifluoride. The more "activated" the metal particulate, the more reactive and, thus, beneficial is the particulate in its reactivity with the aforesaid reactant gases. Of special value is the desire for enhanced activated particulate PGMs, for reaction with the aforesaid reactant gases selected from carbon monoxide, phosphorous trifluoride and mixtures thereof with hydrogen.

However, todate, the present PGM extraction processes suffer from being relatively expensive.

Accordingly, there is a need for an extraction and separation process adaptable to provide individual pure metals from various materials, comprising a plurality of such metals, in an efficacious, economic, and environmentally safe manner.

SUMMARY OF THE INVENTION

It is an object of the present invention to provide a process for the production of particulate PGM, which is simpler, environmentally cleaner, cheaper and safer than known processes.

Accordingly, in one aspect, the invention provides a process for producing an activated PGM, for subsequent reaction with a gaseous reactant, from a material comprising a PGM compound, wherein said PGM is selected from the group consisting of Pt, Pd, Os, Ir, Ru, Rh and Re, said process comprising (i) preparing an aqueous solution containing ions of said PGM from said material;

(ii) adjusting the pH of said solution to a value selected from 6–8;

(iii) treating said pH adjusted solution with a reducing agent to precipitate said activated PGM as a particulate metal; and (iv) separating said particulate activated PGM.

Preferably, the reducing agent is selected from hydrogen, hydrazine, hydroxylamine, hydrogen sulfide and sulfur dioxide of and, most preferably, hydrogen. The pH is, preferably, selected from 6.8 to 7.8, and the aqueous solution agitated by ultrasound radiation.

Although volatile PGM complexes of PGMs are known to be thermally decomposable to the pure metal, we have surprisingly discovered that individual pure PGM can be prepared from mixtures of a plurality of the volatile PGM complexes by selective thermal decomposition of the mixtures.

Thus, in one aspect, the invention provides a process for preparing a pure PGM from a material comprising a plurality of PGM compounds, wherein said PGM is selected from the group consisting of Pt, Pd, Os, Ir, Ru, Rh and Re, said process comprising producing a particulate activated PGM by a process as hereinabove defined, and further comprising (a) reacting said particulate activated PGM with a gaseous reactant to produce a gaseous mixture comprising at least a first volatile PGM complex having a first decomposition temperature and a second volatile PGM complex having a second decomposition temperature, said first decomposition temperature being lower than second decomposition temperature, and a first residue;

(b) separating said gaseous mixture from said first residue;

(c) heating said gaseous mixture to said first decomposition temperature to produce a pure first PGM and a first volatile PGM complex-free gaseous mixture;

(d) collecting said pure first PGM;

(e) heating said first volatile PGM complex-free gaseous mixture to said second decomposition temperature to produce a pure second PGM and a second gaseous mixture; and (f) collecting said pure second PGM.

The reactant gas is, preferably, selected from CO, H, $PF_3$ and mixtures thereof.

Thus, in one aspect, the invention provides a process as hereinabove defined wherein said gaseous reactant is selected from the group consisting of CO, $PF_3$, CO/$H_2$, $H_2/PF_3$ and mixtures thereof.

Preferably, the gaseous reactant is $PF_3$, said first PGM is palladium, said second PGM is platinum, said first volatile PGM complex is $Pd(PF_3)_4$ and said second volatile PGM complex is $Pt(PF_3)_4$.

In a further aspect, the gaseous reactant is a gaseous mixture of $PF_3$ and $H_2$, said first PGM is rhodium, said second PGM is Ir, said first volatile PGM complex is $HRh(PF_3)_4$ and said second volatile PGM complex is $HIr(PF_3)_4$.

It is highly desirable and in some cases the activated PGM must be in a particulate form in order for it to react with the gaseous reactant. Thus, ores, concentrates and the like comprising the starting materials wherein the PGM is in the form of an oxide, sulfide or complex state should be initially treated by reduction to produce the PGM in metal per se form. Physical separation techniques to enhance the PGM from impure starting ores, concentrates and the like, such as froth flotation, grinding and roasting may be used. Thus, one inventive aspect of the process includes such prior treatment steps, if and when desirable, to provide the PGMs per se.

Accordingly, in a further aspect the invention provides a process for the production of pure PGMs from a material comprising a plurality of PGMs in a form selected from the group consisting of metals, metal sulphides, metal oxides, metal sulphides, mattes, ores, slag, scrap, slurry, concentrate, metallic intermediates and by-products, said process comprising producing a particulate activated PGM by a process as hereinabove defined and further comprising
 (a) treating said particulate material when a metal selected from a first group consisting of Pt and Pd is present with an effective amount of $PF_3$ to produce a first complex selected from the group consisting of $Pt(PF_3)_4$ and $Pd(PF_3)_4$ and a first residue;
 (b) removing said first complex from said first residue;
 (c) treating said first residue when a metal selected from a second group consisting of Rh and Ir is present with an effective amount of a mixture of $PF_3/H_2$ to produce a second complex selected from the group consisting of $HRh(PF_3)_4$ and $HIr(PF_3)_4$ and a second residue;
 (d) removing said second complex from said second residue;
 (e) treating said second residue when a metal selected from a third group consisting of a metal selected from Os, Re and Ru is present with an effective amount of a chlorination agent to produce a third group metal chloride compound in admixture with said second residue
 (f) adding copper powder to said third group metal chloride compound mixture to produce a copper powder admixture;
 (g) treating said copper powder admixture with an effective amount of $PF_3/H_2$ mixture to produce a third complex selected from the group consisting of $H_2Ru(PF_3)_4$ and $H_2Os(PF_3)_4$ and a third residue;
 (h) separating said third complex from said third residue; and
 (i) optionally, heating said first, said second and/or said third complexes at their respective decomposition temperatures to produce said pure PGMs.

We have found the invention to be of value when the aforesaid mixture in the form of ore or the like further comprises other transition metals, such as, for example, Ni, Co and Fe, which are well-known to form volatile compounds thermally decomposable to the pure metal.

The pure metal may be formed by thermal decomposition deposition as a coating, skin, shell or the like of desired thickness, but most preferably, as a powder.

One preferred aspect of the invention provides the resultant PGM as a particulate solid deposited within an optionally heated chamber.

In another preferred aspect, the invention provides an improved method of producing a matte of PGMs of enhanced purities from which matte individual pure PGMs can be more efficaciously obtained. In this aspect, the starting matte material is reacted initially with, for example as gaseous reactants, $PF_3$ and $H_2$ mixture to form a plurality of individual volatile PGM complexes in admixture, which admixture is removed from the matte and, subsequently, thermally decomposed under conditions which may readily provide one or more pure PGMs or, alternatively, produce an enhanced purified matte, optionally for subsequent treatment in one or more process steps as hereinbefore defined.

The aforesaid process can be further broadened to include the production of Ru and Os powders by adding, for example, copper powder to the initial matte and subsequent reactant $PF_3/H_2$ treatment.

We have found, surprisingly, that Ag, Au, Ni, Co, Fe and Cu do not interfere with the extraction and separation process according to the invention.

BRIEF DESCRIPTION OF THE DRAWINGS

In order that the invention may be better understood, preferred embodiments will now be described, by way of example only, with reference to the accompanying drawings, wherein.

DETAILED DESCRIPTION OF PREFERRED EMBODIMENTS

Experiments A and B were carried out with commercial platinum black powder and treated with $PF_3$ according to the prior art. The results show that inefficient reaction occurred.

Experiment A 1.0 g of platinum black powder was charged to a reactor and pressurized to 425 psi with $PF_3$ for 28 hrs. The reactor was then depressurized through a heated tube at 200° C. to decompose the platinum on the inside surface of the tube at a flow of 100 cc/min. The tube inside surface was analyzed for platinum and the result was negative. The mass balance also indicated that platinum was not removed from the reactor.

Experiment B 1.0 g of platinum black powder were charged to the reactor and the reactor assembly was heated to 350° C. Hydrogen was introduced at a rate of 1L/min to the reactor to reduce the feed. After one and half hours of reduction, the hydrogen flow was discontinued and the reactor was cooled down to room temperature. The $PF_3$ from the supply cylinder was trapped in the reactor by cooling it further to −70° C. The temperature of the reactor was then slowly brought up to 100° C. At this temperature reading, the reactor pressure reached 510 psi. The system was kept under this pressure for 28 hrs. The same procedure as described in experiment A was followed to recover the platinum. Mass balance and surface analysis indicated there was no movement of platinum from reactor to decomposer.

Experiments C and D describe the preparation of an activated PGM metallic matte in particulate form according to the invention which was subsequently found to readily form gaseous complexes as described in Examples 1–3 as hereinafter described.

Experiment C

A PGM chlorides mixture (10.0 g) containing 30% Pt, 15% Pd, 4% Rh, 2% Ir, 1% Os and 1% Re on W/W basis was dissolved in water (200 ml), the pH adjusted to 6.4 with dilute ammonia, and subjected to agitation at 45° C. in an ulstrasonic bath. Hydrogen gas was passed through the solution at a rate of 50 ml/min to immediately produce a black precipitate, which was subsequently collected, water washed and dried at 40° C. under argon.

Experiment D

Experiment C was repeated but wherein the PGM chlorides mixtures was initially prepared by reaction of a PGMs-containing ore with aqua regia.

The following description provides general process schemes of extraction of activated PGMs made according to the invention as hereinabove defined with reference to the drawings.

The extraction procedures, generally, involve PGM compounds reduction and the formation of complexes with $PF_3$ and $H_2$. The volatile PGM complexes are then removed from the reaction vessel and decomposed to produce pure PGMs and reagent gases. The PGMs separations can be divided in three stages.

Figure 1:
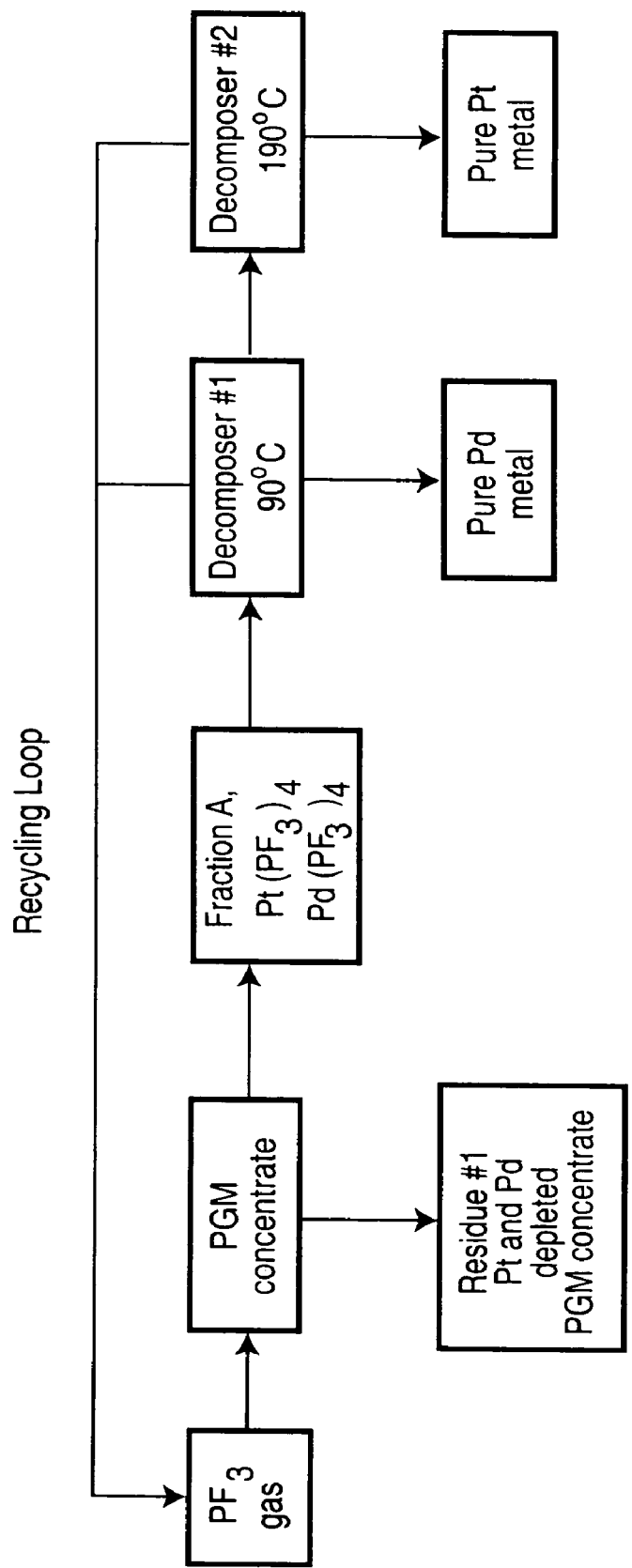
FIG. 1 represents a diagrammatic extraction process for Pt and Pd.

With reference to FIG. 1, the first stage involves the reaction of the PGM metal with pure $PF_3$. Only platinum and palladium can react in these conditions(fraction A). Platinum and palladium form volatile $Pt(PF_3)_4$ and $Pd(PF_3)_4$ compounds that are separated using the difference between their thermal decomposition temperatures. Platinum trifluorophosphine complex is distilled out at 90° C. While in contrast, palladium trifluorophosphine complex is not stable at these conditions and decomposes to Pd and $PF_3$. Although preparation of the platinum and palladium complexes with $PF_3$ is described in the literature, much higher yields were achieve using an extraction system that recycled reagent gas through an extraction reactor. Moreover, such extraction was achieved at much lower pressures and temperatures of extraction.

Figure 2:
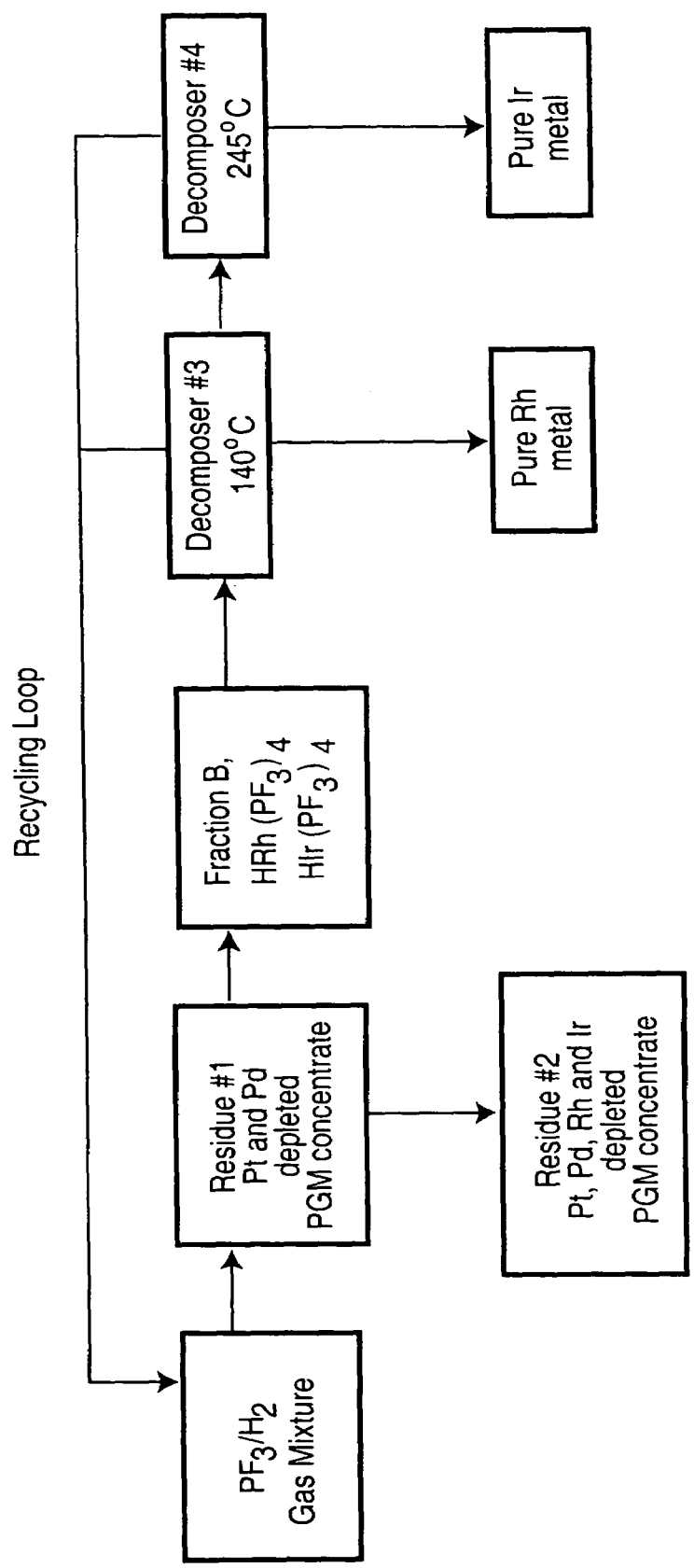
FIG. 2 represents a diagrammatic extraction process for Rh and Ir.

With reference to FIG. 2, the second stage of the PGMs extraction involves the reaction of residual PGMs with a $PF_3/H_2$ gas mixture. Two of the remaining metals form volatile $PF_3/H_2$ complexes, namely, $HRh(PF_3)_4$ and $HIr(PF_3)_4$. It is most surprising that using reagent gases recycling steps it was possible to achieve direct reaction with rhodium and iridium metals and $PF_3/H_2$ gas mixture. Literature data teaches that such reaction take place only when iridium and rhodium halogens are used as admixture with metallic Cu powder. Following extraction, liquid $PF_3/H_2$ complexes (Fraction B) were easily separated by selective decomposition as indicated in FIG. 2.

Figure 3:
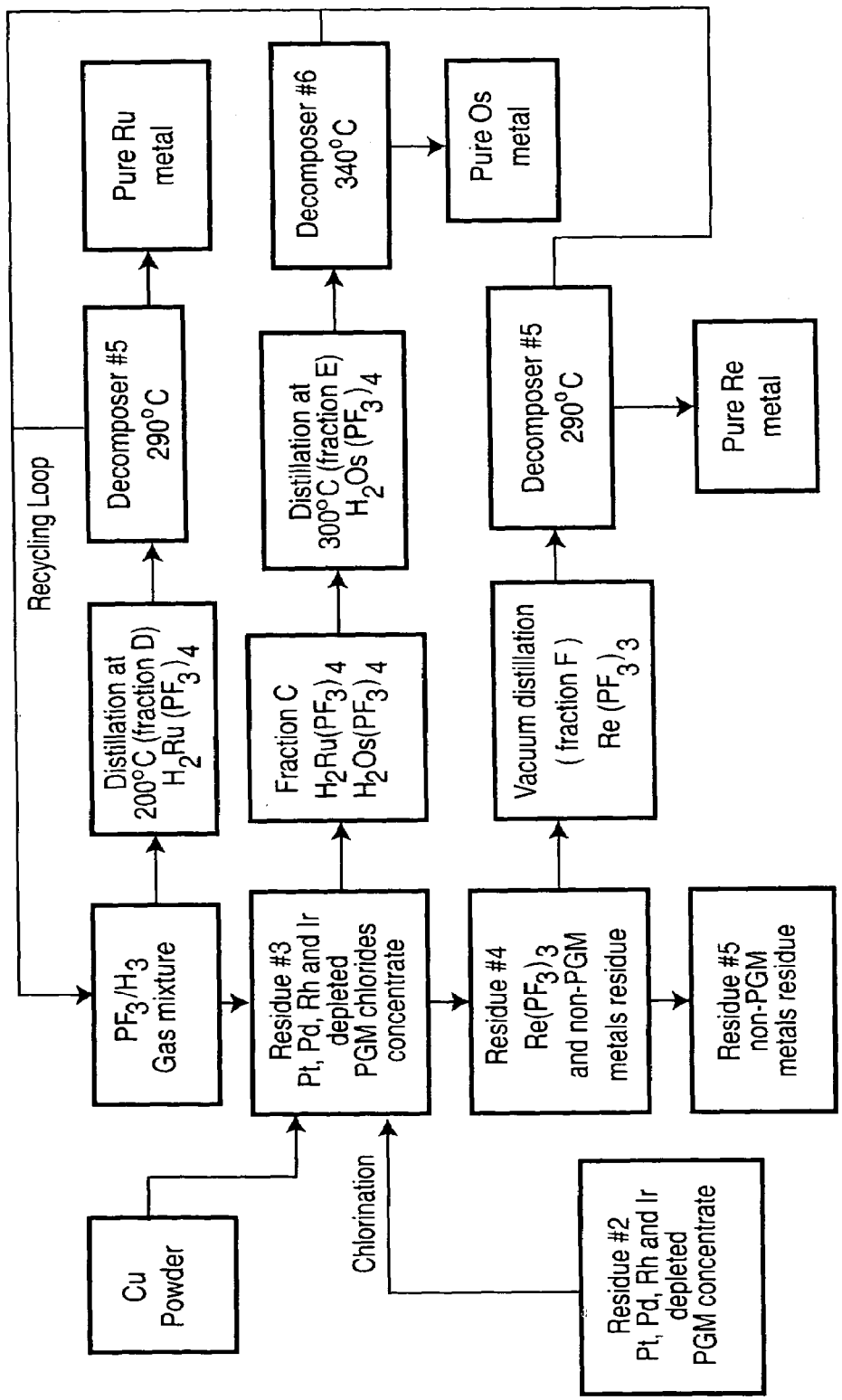
FIG. 3 represents a diagrammatic extraction process for Ru, Os and Re.

With reference to FIG. 3, the third stage of extraction comprises the separation of Ru, Os and Re by conversion to their chlorides and subsequent reaction with $PF_3/H_2$ gaseous mixture in the presence of copper powder. The resultant complexes were separated as described in FIG. 3.

Thus, the general scheme of the processes described in the embodiments is as follows.

The first stage involves the reaction of the PGMs with pure $PF_3$, wherein only platinum and palladium react to form volatile $Pt(PF_3)_4$ and $Pd(PF_3)_4$ compounds (fraction A), respectively, that are separated from remaining solid residue 1.

1. Since $Pd(PF_3)_4$ is stable only under $PF_3$ pressure and is, thus, decomposed into pure Pd metal in the form of powder, foam, net-shapes, pellets or the like and $PF_3$ at room temperature. The $Pt(PF_3)_4$ remaining is distilled out at 90° C. to a second decomposer.

2. $Pt(PF_3)_4$ is decomposed in the second decomposer to platinum metal in the form of powder, foam, net-shapes, pellets or the like at 190–200° C. and the $PF_3$ produced is recycled.

3. The second stage of separation is the reaction of residue 1 with a $PF_3/H_2$ gas mixture. Two of the metals form volatile $PF_3/H_2$ complexes, namely $HRh(PF_3)_4$ and $HIr(PF_3)_4$ which are distilled out at 100° C. (fraction B) to leave behind solid residue 2.

Thus, embodiment may be described generally as follows.

4. The Rh and Ir $PF_3/H_2$ complexes are passed into decomposer 3, wherein $HRh(PF_3)_4$ is decomposed at 140° C. to pure Rhodium metal in the form of powder, foam, net-shapes, pellets or the like and $PF_3$ gas.

5. The remaining $HIr(PF_3)_4$ and $PF_3$ gas mixture is passed into decomposer 4, wherein $HIr(PF_3)_4$ is decomposed into iridium metal in the form of powder, foam, net-shapes, pellets or the like above 245° C. and the $PF_3$ gas is recycled.

6. Stage 3 involves the preparation of the $PF_3/H_2$ complexes of Os and Ru from residue 2, which is converted into chlorides in residue 3. The solid chloride residue 3 is mixed with copper powder and reacted with $PF_3/H_2$ gas mixture.

7. Volatile $H_2Ru(PF_3)_4$ and $H_2Os(PF_3)_4$ are removed from the reaction vessel to leave residue 4 and condensed into a storage tank (fraction C). Residue 4 consists of solid $Re(PF_3)_5$ together with possibly metals, such as, Ag, Cu and Au, and chlorides thereof.

8. Volatile $H_2Ru(PF_3)_4$ is distilled out at 200° C. (boiling point 180° C.) (fraction D) and passed into decomposer 5 where it is decomposed (290° C.) into pure ruthenium metal in the form of powder, foam, net-shapes, pellets or the like and $PF_3$ gas for recycling.

9. Volatile $H_2Os(PF_3)_4$ (boiling point 280° C.) is distilled out at 300° C. (fraction E) and passed into decomposer 6 where it is decomposed (340° C.) into pure osmium metal in the form of powder, foam, net-shapes, pellets or the like and $PF_3$ gas for recycling.

10. The separation of $Re(PF_3)_5$ from final residue 5 is achieved using vacuum sublimation (fraction F). $Re(PF_3)_5$ has a melting point of 182° C. and decomposition point of 288° C. The gaseous $Re(PF_3)_5$ is passed into decomposer 6. During the decomposition of $Re(PF_3)_5$ pure rhenium metal in the form of powder, foam, net-shapes, pellets and the like and $PF_3$ gas is produced; and the reagent gas is recycled.

11. Any remaining precious metals, such as gold and silver, do not form complexes with $PF_3$ and therefore remain as residue 5.

| Experiment # | Reactor | Pressure of $PF_3$ (bar) | Temperature (° C.) | Time (h) | Yield of Pt (%) | Yield of Pd (%) |
|---|---|---|---|---|---|---|
| 1 | Static Reactor 1 | 100 | 170 | 12 | 48 | 16 |
| 2 | Static Reactor 1 | 100 | 100 | 12 | 50 | 18 |
| 3 | Agitated Reactor 2 | 20 | 90 | 12 | 99 | 98 |
|   |   |   |   |   | Yield of Rh (%) | Yield of Ir (%) |
| 4 | Static Reactor 1 | 250 | 170 | 24 | 5 | 3 |
| 5 | Agitated Reactor 2 | 100 | 100 | 24 | 98 | 99 |

EXAMPLE 1

PGMs (100 g) matte containing, approximately, the following as wt %, of 30% Pt, 15% Pd, 4% Rh, 4.9% Ru, 2% Ir, 1% Os and 1% Re was ground to a powder and placed in a pressure vessel to reactor which was cooled to −80° C. 100 g of liquid $PF_3$ at this temperature was added. The reactor was sealed and the temperature increased to 170° C. Whereby the pressure increased to 170 bar and the temperature maintained for 12 hours. The reactor was cooled to −40° C. and unreacted $PF_3$ gas removed from the reactor and recycled. The reactor contents were warmed, liquid $Pd(PF_3)_4$ removed and decomposed to Pd powder (Yield 3.2 g, 0.16%) at room temperature and $PF_3$ gas recycled. The temperature of the reactor was increased to −15° C., and liquid $Pt(PF_3)_4$ removed from the reactor. Liquid $Pt(PF_3)_4$ was vaporized at 100° C. and subsequently decomposed into Pt powder and $PF_3$ at 200° C. (Yield 12 g, 48%).

EXAMPLE 2

100 g of PGMs matte containing 30% of Pt, 15% of Pd, 4% of Rh, 4.9% Ru, 2% Ir, 1% of Os and 1% of Re was treated as described in example 1, but the temperature of the reactor was kept at 100° C. After decomposition of the $Pd(PF_3)_4$ and $Pt(PF_3)_4$ into 3.6 g pure Pd and 12.5 g Pt powders, respectively, (yield of 18% Pd and 50% Pt).

EXAMPLE 3

100 g of PGMs matte containing 30% of Pt, 15% of Pd, 4% of Rh, 4.9% Ru, 2% Ir, 1% of Os and 1% of Re was pre-treated as described in example 1, but modified as follows. Compressed gaseous $PF_3$ was passed through the reactor at 20 bar pressure and 90° C. After reaction particular materials were filtered out, gaseous product mixture was passed through heat exchangers at −10° C. and liquid $Pd(PF_3)_4$ and $Pt(PF_3)_4$ were kept under pressure of $PF_3$ at −5° C. for further treatment. After the $Pd(PF_3)_4$ and $Pt(PF_3)_4$ were depleted from the process gas, $PF_3$ was reintroduced into reactor with additional $PF_3$ to keep the pressure at 20 bar. Progress of the reaction was monitored by weight lost in the reactor. After approximately 24 hours, the reaction was complete and the liquid mixture of $Pd(PF_3)_4$ and $Pt(PF_3)_4$ was then introduced under pressure into a first decomposer at 90° C. to produce 19.8 g of pure palladium powder. The residual gaseous mixture was then passed to a second powder decomposer at 200° C. to produce 24.8 g of pure platinum powder. The remaining $PF_3$ was pressurized to 50 bars and recycled. Yield of palladium and platinum powders was 98 and 99%, respectively.

EXAMPLE 4

100 g of residue, after extraction of Pd and Pt containing 7% of Rh, 9% Ru, 4% Ir, 2% of Os and 2% of Re was pressurized to 250 atm with a $PF_3/H_2$ gas mixture in a static reactor heated to 170° C. After 24 h, the resulting liquid was vaporized and passed through a decomposer (No.3) at a temperature of 140° C. to produce 0.35 g (5%) pure Rh powder. The resultant gas mixture was passed through a decomposer (No.4) at a temperature of 145° C. to produce pure 0.6 g (3%) iridium metal and a regenerated $H_2/PF_3$ gaseous mixture.

EXAMPLE 5

100 g of residue after extraction of Pd and Pt containing 7% of Rh, 9% Ru, 4% Ir, 2% of Os and 2% of Re was placed into a reactor $H_2/PF_3$ gaseous mixture comprising a partial pressure of 90 bar $PF_3$ and partial pressure of 30 bar $H_2$ passed there through. The resulting $H_2/PF_3$ complexes were liquefied in a heat exchanger at 5° C. After extraction was completed, liquid complexes of Rh and Ir were evaporated and passed through decomposers No.3 and No.4 as described in Example 4 to yield 6.9 g (99%) of rhodium metal and 3.8 (95%) iridium metal. The $H_2/PF_3$ gas mixture was recycled.

EXAMPLE 6

100 g of a mixture of $PtCl_4$, $PdCl_4$, $RhCl_3$ and $IrCl_3$ (40:20:30:10) in admixture with 240 g of freshly reduced copper was changed to a reactor which was then vacuum purged from oxygen and filled with $PF_3$ at 40 bars and the temperature raised to 60° C. The procedure was subsequently followed as in Example 3 to yield 22 g of Pt (95% yield) and 7.7 g of Pd (90% yield).

EXAMPLE 7

100 g of mixture of $RhCl_3$ and $IrCl_3$ (75:25) was mixed with 277 g of freshly reduced copper and the process as described in Example 5 was followed, but wherein the pressure and temperature was kept lower (60 bar of $PF_3$ and 20 bar of $H_2$, 120° C.). The yield was 33 g of Rh (92%) and 14.3 g of Ir (89%).

REFERENCES

1) J. F. Nixon, Adv. in Inorg. Chem. and Radiochem., 13, 413 (1970); T. Kruck, Angew. Chem. (Eng. Ed.), 79, 53 (1967),
2) T. Kruck, W. Lang and N. Derner, Z. Naturforschg. 20b, 705 (1965).
3) T. Kruck and R. Kobelt, Chem. Ber., 105, 3765 (1972).
4) T. Kruck, K Baur and W. Lang, Chem. Ber., 101, 138 (1968).
5) T. Kruck, W. Lang, N. Derner and M. Stadler, Chem. Ber., 101, 3816 (1968).
6) C. L. Hammill, R. J. Clark, C. W. Ross, A. G. Marshall and J. Schutz, Inorg. Chem. 36, 5973 (1997).

Although this disclosure has described and illustrated certain preferred embodiments of the invention, it is to be understood that the invention is not restricted to those particular embodiments. Rather, the invention includes all embodiments which are functional or mechanical equivalents of the specific embodiments and features that have been described and illustrated.

The invention claimed is:

1. A process for preparing pure PGMs from a material comprising a plurality of PGM compounds, wherein said PGM is selected from the group consisting of Pt, Pd, Os, Ir, Ru, Rh and Re, said process comprising:
   (i) preparing an aqueous solution containing ions of said plurality of PGMs from said material;
   (ii) adjusting the pH of said solution to a value selected from 6–8;
   (iii) treating said pH adjusted solution with a reducing agent to precipitate said activated PGMs as particulate metals;
   (iv) collecting said particulate activated PGMs;
   (v) reacting said particulate activated PGMs with a gaseous reactant to produce a gaseous mixture comprising at least a first volatile PGM complex having a first decomposition temperature and a second volatile PGM complex having a second decomposition temperature, said first decomposition temperature being lower than second decomposition temperature, and a first residue;
   (vi) separating said gaseous mixture from said first residue;
   (vii) heating said gaseous mixture to said first decomposition temperature to produce a pure first PGM and a first volatile PGM complex-free gaseous mixture;
   (viii) collecting said pure first PGM;
   (ix) heating said first volatile PGM complex-free gaseous mixture to said second decomposition temperature to produce a pure second PGM and a second gaseous mixture; and
   (x) collecting said pure second PGM.

2. A method as defined in claim 1 wherein said reducing agent is selected from hydrogen, hydrazine, hydroxylamine, hydrogen sulfide and sulfur dioxide.

3. A method as defined in claim 2 wherein said reducing agent is hydrogen.

4. A method as defined in claim 1 wherein said aqueous solution has a pH selected from 6.8 to 7.8.

5. A method as defined in claim 1 wherein said solution is subject to ultrasonic action during said treatment.

6. A method as defined in claim 1 wherein said PGM is selected from platinum and palladium.

7. A method as defined in claim 1 wherein said solution further comprises ions of a metal selected from nickel and copper.

8. A process as defined in claim 1 wherein said gaseous reactant is selected from the group consisting of CO, $PF_3$, $CO/H_2$, $H_2/PF_3$ and mixtures thereof.

9. A process as defined in claim 8 wherein said gaseous reactant is $PF_3$, said first PGM is Pd, said second PGM metal is Pt, said first volatile PGM complex is $Pd(PF_3)_4$ and said second volatile PGM complex is $Pt(PF_3)_4$.

10. A process as defined in claim 8 wherein said gaseous reactant is $PF_3/H_2$, said first PGM is Rh, said second PGM is Ir, said first volatile PGM complex is $HRh(PF_3)_4$ and said second volatile PGM complex is $HIr(PF_3)_4$.

11. A process for the production of pure PGMs from a material comprising a plurality of PGMs selected from the group consisting of Pt, Pd, Os, Ir, Ru, Rh and Re in a form selected from the group consisting of metals, metal oxides, metal sulphides, ores, slag, scrap, slurry, concentrate, metallic intermediates, and by-products said process comprising:
   (i) preparing an aqueous solution containing ions of said plurality of PGMs from said material;
   (ii) adjusting the pH of said solution to a value selected from 6–8;
   (iii) treating said pH adjusted solution with a reducing agent to precipitate said activated PGMs as particulate metals;
   (iv) collecting said particulate activated PGMs;
   (v) treating said particulate activated PGM when a metal selected from a first group consisting of Pt and Pd is present with an effective amount of $PF_3$ to produce a first complex selected from the group consisting of $Pt(PF_3)_4$ and $Pd(PF_3)_4$ and a first residue;
   (vi) removing said first complex from said first residue;
   (vii) treating said first residue when a metal selected from a second group consisting of Rh and Ir is present with an effective amount of a mixture of $PF_3/H_2$ to produce a second complex selected from the group consisting of $HRh(PF_3)_4$ and $HIr(PF_3)_4$ and a second residue;
   (vii) removing said second complex from said second residue;
   (ix) treating said second residue when a metal selected from a third group consisting of a metal selected from OS, Re and Ru is present with an effective amount of a chlorination agent to produce a third group metal chloride compounds, residue
   (x) adding copper powder to said third group metal chloride compound mixture to produce a copper powder admixture;
   (xi) treating said copper powder admixture with an effective amount of $PF_3/H_2$ mixture to produce a third complex selected from the group consisting of $H_2Ru(PF_3)_4$ and $H_2Os(PF_3)_4$ and a third residue;
   (xii) separating said third complex from said third residue; and
   (xiii) optionally, heating said first, said second and/or third complexes at their respective decomposition temperatures to produce said pure PGMs.

12. A process of obtaining a purified mixture of a plurality of PGMs selected from the group consisting of Pt, Pd, Ir, Os, Rh, Ru and Re, from a first mixture selected from the group consisting of a matte, ore, slag, concentrate, metallurgical intermediate and by-product comprising said PGMs in a form selected from a PGM per se, and the group consisting of alloys and compounds thereof, said process comprising:
   (i) preparing an aqueous solution containing ions of said plurality of PGMs from said material;
   (ii) adjusting the pH of said solution to a value selected from 6–8;
   (iii) treating said pH adjusted solution with a reducing agent to precipitate said activated PGMs as particulate metals;
   (iv) collecting said particulate activated PGMs;
   (v) treating said first mixture with a gaseous mixture comprising an effective amount of $PF_3$ and $H_2$ to form a plurality of individual volatile PGM compounds selected from the group consisting of $Pt(PF_3)_4$, $Pd(PF_3)_4$, $HRh(PF_3)_4$ and $HIr(PF_3)_4$ in admixture and a first residue;
   (vi) removing said plurality of volatile PGM compounds in said admixture from said first residue; and (vii) thermal decomposing said plurality of volatile PGM compounds at an effective decomposition temperature to produce said purified mixture of said plurality of PGMs.

13. A process as defined in claim 12 comprising pre-treating said first mixture with
(i) a chlorination agent to produce a plurality of metal chloride compounds;
(ii) adding Cu powder to said metal chloride compounds to produce a pre-treated first mixture, and subsequently subjecting said pre-treated first mixture to steps (v), (vi) and (vii) in the analogous manner as for said first mixture.

* * * * *